United States Patent [19]

Stephany

[11] Patent Number: 5,233,366
[45] Date of Patent: Aug. 3, 1993

[54] HALF-TONE PRINTING WITH THERMAL INK JET USING RANDOM SPOT DISTRIBUTION IN ONE DIMENSION

[75] Inventor: Joseph F. Stephany, Williamson, N.Y.

[73] Assignee: Xerox Corporation, Stamford, Conn.

[21] Appl. No.: 888,067

[22] Filed: May 26, 1992

[51] Int. Cl.⁵ .................. G01D 9/00; G01D 15/16; H04N 1/73
[52] U.S. Cl. ................... 346/1.1; 346/140 R; 358/298; 358/456
[58] Field of Search ........ 346/140 R, 75, 1.1; 358/296, 298, 456, 457, 458, 459, 460

[56] References Cited

U.S. PATENT DOCUMENTS

| | | | |
|---|---|---|---|
| 4,032,978 | 6/1977 | Wong | 358/283 |
| 4,312,005 | 1/1982 | Iwasaki | 346/75 |
| 4,394,662 | 7/1983 | Yoshida et al. | 346/33 R |
| 4,642,653 | 2/1987 | Ito et al. | 346/1.1 |
| 4,680,596 | 7/1987 | Logan | 346/140 PD |
| 4,680,645 | 7/1987 | Dispoto et al. | 358/298 |
| 4,692,773 | 9/1987 | Saito et al. | 346/1.1 |
| 4,750,010 | 6/1988 | Ayers et al. | 358/298 X |
| 4,774,530 | 9/1988 | Hawkins | 346/140 R |
| 4,849,768 | 7/1989 | Graham | 346/1.1 |
| 4,959,730 | 9/1990 | Tai et al. | 358/298 |

Primary Examiner—Benjamin R. Fuller
Assistant Examiner—David Yockey
Attorney, Agent, or Firm—R. Hutter

[57] ABSTRACT

Areas of a predetermined gray-scale in a desired image are printed on a sheet by a linear array of ink-jet ejectors. The individual ejectors are operated according to a probability function which controls the frequency of a random activation of the ejectors as the sheet moves past the ejectors. The frequency of activation is a function of the desired gray-scale of the area being printed. The resulting spots on the sheet are distributed in uniform lines in one dimension and randomly in another dimension.

9 Claims, 5 Drawing Sheets

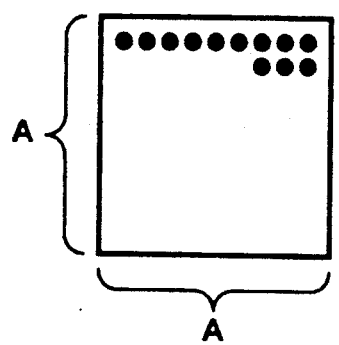
FIG. 1A
FIG. 1B 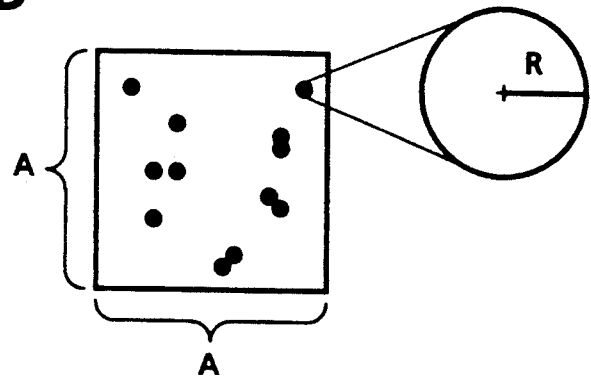 FIG. 1D
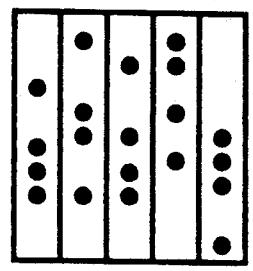
FIG. 1C

HALF-TONE PRINTING WITH THERMAL INK JET USING RANDOM SPOT DISTRIBUTION IN ONE DIMENSION

BACKGROUND OF THE INVENTION

The present invention relates to a method and apparatus for creating images having "half-tone" or "gray-scale" areas with ink jet printing apparatus.

In thermal ink jet printing, droplets of ink are selectively emitted from a plurality of drop ejectors in a printhead, in accordance with digital instructions, to create a desired image on a copy sheet (e.g. a sheet of plain paper). The printhead typically comprises a linear array of ejectors for conveying the ink to the sheet. The printhead may move back and forth relative to the sheet in a typewriter fashion, for example to print characters, or the linear array may extend across the entire width of a sheet moving relative to the printhead. The ejectors typically comprise capillary channels, or other ink passageways, which are connected to one or more common ink supply manifolds. Ink from the manifold is retained within each channel until, in response to an appropriate digital signal, the ink in the channel is rapidly heated and vaporized by a heating element disposed within the channel. This rapid vaporization of the ink creates a bubble which causes a quantity of ink to be ejected through the nozzle to the copy sheet. One patent showing the general configuration of a typical ink jet printhead is, for example, U.S. Pat. No. 4,774,530, assigned to the assignee of the present application.

In general, the thermal ink-jet printing process is an all or nothing binary process. In most commercially-available techniques of ink-jet printing, a spot of ink is deposited on the sheet wherever printing is desired, and no ink is deposited where the "white areas" of an image is desired. This binary process is acceptable and in fact desirable when alphanumeric characters or other symbols are being printed. A problem arises, however, when images employing gradations in continuous tones, known as "half tones" or "gray-scales," are to be printed, such as in the printing of photographs. In conventional offset printing, this problem is commonly solved by transforming the continuous tone of the original image into half tone or pseudo-half tone images. Half tone images typically comprise a large number of ink spots of various sizes. The size of the ink spots correspond to the shades or tones to be reproduced. When the spots in the corresponding spaces on the sheet between the spots are small compared to the visual acuity of the human eye, they become subliminal to the eye and not recognized. The spots and the spaces on the sheets thus fuse visually and trick the eye into believing that various shades of continuous tones are seen. Pseudo-half tone images refers to the process of reproducing the continuous tone images or gray scale with a printing device having a fixed printed spot size, and fixed spot-to-spot spacing. The level of gray to be reproduced, thus, is represented by a number of spots which are printed out of a specified line segment or matrix array of printing positions. If the individual spots are sufficiently small, they effect a merger insofar as the eye is concerned to form a visual merger with the spaces between the spots to cause the eye to believe it is seeing various shades of continuous tones.

In ink-jet printing, however, it is difficult to create the variety of spot sizes caused by individual droplets of ink deposited on the sheet to create half tones with reliable precision or accuracy. Various external factors, such as ambient temperature, have a significant effect on the actual sizes of spots created by individual droplets in the ink-jet printing process. Although various techniques have been proposed to ensure the consistency of spot size regardless of temperature, direct control of individual spot size for purposes of half toning is at this time either technically or commercially impractical.

U.S. Pat. No. 4,032,978 discloses a pseudo half tone print generator in which gray scale levels are converted to pseudo half tone print. The gray scale level of the desired image is compared to a reference count for each print position in a print line to generate a print signal upon the level being greater than the count. N adjacent print lines are grouped together to form a series of N×M matrices. For each gradation of gray scale, an additional spot is printed within each N×M matrix. The arrangement of additional spots within the matrix is such as to minimize the difference between the sums of the count element values for any two adjacent print lines.

U.S. Pat. No. 4,312,005 discloses an ink-jet printing apparatus in which droplets are ejected from a nozzle in the form of a stream and then electrostatically charged by an electrode disposed next to the path of the droplets. A voltage is applied to a first electrode when it is desired to print a spot to deflect ink particles onto a moving sheet, while an alternating voltage is applied to a second deflection electrode to deflect the droplets perpendicular to the deflection direction of the first electrode. Thus, a cluster of droplets are formed on the sheet, each droplet having a diameter equal to a desired spot size.

U.S. Pat. No. 4,394,662 discloses a control system for a "dot printer" wherein the amplitude of a gray scale input signal is modulated prior to application to the recording head, so that the modulated gray scale signal oscillates above and below a threshold level when the input signal is at a low voltage level. The average value of the optical densities thus obtained over a plurality of picture elements equals the average value of the gray scale input which occurs during the period corresponding to the printing of particular picture elements.

U.S. Pat. No. 4,642,653 discloses a half tone system for an ink-jet printer wherein adjacent spots deposited on the sheets are caused to overlap by predetermined amounts, so that the areas of overlap between spots will become visually redundant. That is, to adjacent spots with a large overlap will place less black area on a sheet then two adjacent spots with a small overlap. The pitch for determining the amount of overlap is variable to accomplish gradation in numerous densities.

U.S. Pat. No. 4,680,596 discloses a technique for controlling a group of ink-jet printing heads to selectively supply spots of one color and substantially thick size in a random pattern for decorative purposes. A group of ink-jet heads apply colored spots to the spot positions of a pixel area in accordance with a randomly selected area.

U.S. Pat. No. 4,680,645 discloses a method of creating gray scales with variable spot sizes. A look-up table is used to determine a spot size corresponding to a density value or gray level in the desired image.

U.S. Pat. No. 4,849,768 discloses an apparatus for printing random patterns with fluid jets. A piezoelectric crystal artificially stimulates a flui supply chamber of a fluid jet with coherent acoustic energy to purposely generate standing waves therein. Although sized droplets will be formed at substantially the same frequency from each fluid jet, individual droplets will be formed so as to be out of phase with adjacent neighbors in accordance with the standing wave pattern. By selecting a very short print time, a wide range of random interference patterns can be created on the sheet, particularly patterns simulating natural wood grains including knot holes.

SUMMARY OF THE INVENTION

According to one aspect of the present invention, there is provided a method of printing a desired image on a sheet, the desired image having an area of a predetermined gray scale, comprising the step of emitting droplets of liquid ink from a printhead to print corresponding spots on the sheet. The spots are aligned on the sheet in a series of parallel lines, and the spots are arranged in random spatial distribution within each line of the series of parallel lines.

According to another aspect of the present invention, there is provided an apparatus for printing a desired image having an area of a predetermined gray scale on a sheet. A printhead emits droplets of liquid ink to print spots on the sheet in a series of parallel lines. The printhead is controlled to print spots in random spatial distribution within each line of the series of parallel lines, whereby the proportion of a selected portion of each line that is occupied by a spot relative to the length of the selected portion of the line is dependent on the predetermined gray scale of the area of the desired image.

BRIEF DESCRIPTION OF THE DRAWINGS

In the drawings:

FIGS. 1A, 1B, and 1C are comparative illustrations of the distribution of ink spots in an area to form gray-scales. FIG. 1D is a detailed representation of one ink spot in isolation.

DETAILED DESCRIPTION OF THE PREFERRED EMBODIMENT

Figure 2:
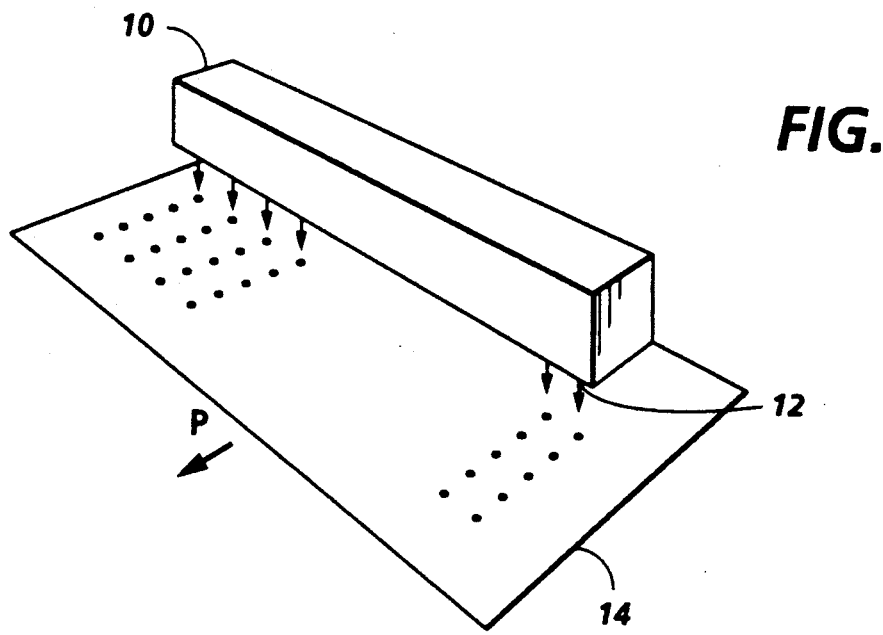
FIG. 2 is a simplified elevational view showing an ink-jet printhead placing spots on a sheet.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

In the generation of the half-tone images by ink-jet or similar printing systems, the various techniques can be divided into two types: the "interacting" type, in which spots are places on a sheet in a way that is dependent upon the position of previous spots, and the "non-interacting" type, wherein the spots comprising the half-tone portion of the image are randomly placed within an area. In other words, in "non-interacting" half-tone printing, the location of one spot is independently selected from the location of any other spot, and the order on which the spots are placed on the sheet makes no difference. An example of interacting spot location is xerography, where the deposition of an individual toner particle greatly influences the position of a subsequent toner particle, because of the selective discharging of the photoreceptor surface in the course of the development step. An example of non-interacting image creation would be photography, where the arrival of photons that trigger photochemical reactions in the halide grains are independent of each other.

For purposes of discussing half-tone printing, a "cell" is defined as an area of the desired image of arbitrary, but preferably very small size, into which spots can be printed and wherein the probability-based optical effects of spot placement may become apparent. That is, each cell in a half-tone image will be defined as having a single predetermined half-tone value, on some scale of gradation from light to dark, which holds true for the total area of the individual cell, regardless of the exact placement of spots within the cell. For example, if it is decided that a particular cell will have 50% ink coverage, one-half of the possible spot areas within the cell will be printed upon, and the exact placement of printed spot areas versus unprinted ones will be generally of no importance. The important factor is ultimate proportion of printed to unprinted areas within the cell. If the size of the cell is small enough, and the resolution of spots within the cell fine enough, the eye of an observer will not be able to detect the placement of individual spots, but will see the cell as an area of a certain uniform shading.

(Although the phrase "gray-scale" will be used throughout the specifications and claims herein, it will be apparent to one skilled in the art that the word "gray" is not necessarily limited to a continuum between white and black where black ink is printed on a white sheet; colored inks may be used in similar fashion, and a number of color inks may be used for full color printing. Still, the general principles of half-toning are applicable regardless of the specific ink color in the ejectors.)

An example of spots being distributed in an area in an interacting manner is shown in FIG. 1A. In the interacting case, if N spots are to be placed in a cell having a size of A by A($A^2$), with the radius of each spot given as R (and thus an area of $\pi R^2$), then the transmission $T_{int}$, defined as the proportion of light on the cell that will be absorbed by N spots of R radius in the cell (or, in other words, the ratio of ink-covered area to total area within the cell) may be calculated as $$T_{int} = 1 - (N\pi R^2/A^2).$$

An example of spots being distributed in an area in a non-interacting manner is shown in FIG. 1B. In the case in which spots are placed in the cell in a non-interacting manner, the calculation of $T_{non}$ is slightly different:

$$T_{non} = [1 - (\pi R^2/A^2)]^N.$$

This equation is derived as follows: let there be N transparent plates, each of area $A^2$, each having one spot of radius R thereon. A detailed view of such a spot of radius R is shown at FIG. 1D. The average transmission of each plate is thus total transmission minus the ratio of the one spot area to the total area of the plate, or $[1-(\pi R^2/A^2)]$. When viewing a cell having several non-interacting spots, one is in effect viewing through several transparent plates, each with one spot thereon, simultaneously. Since there are N such plates (as opposed to the single cell with N spots thereon, as in the interacting case), the total transmission is the product of the transmissions of all N plates, which is the above formula. Significantly, in this equation, the number of spots N becomes an exponent.

In the science of optics, a preferred standard for evaluating the visual perception of gray-scales is "optical density." Optical density is calculated as the base-10 logarithm of the fraction of light reflected from a given area. Equal increments in optical density will appear to be equal increments of darkness to the eye; this response is typical for any sensory organ, and is known as the "Weber-Fechner Law." In creating a system for rendering half-tone images, a linear relationship between optical density and the number of spots N within each cell will result in the most effective shading of half-tone cells in an image, and will produce the best quality print for a given total number of spots possible. In other words, the most effective system for rendering half-tones is one in which a linear increase in the number of spots N results in equal gradations in optical density throughout the range of N, from no spots within a given cell to almost complete coverage of a given cell with spots, i.e. with ink. In the context of spots filling a cell, the optical density D is simply the base-10 logarithm of the transmission T. Thus, in the case of interacting spots, the formula for density is a complicated function of the number of spots N and the logarithm of the equation for $T_{int}$:

$$D_{int} = -\log_{10}[1-(N\pi R^2/A^2)].$$

As can be seen, for the interacting case, the optical density of the interacting spots is a complicated function of the number of spots N. However, in the non-interacting case, the optical density is calculated as:

$$D_{non} = -N\log_{10}[1-(\pi R^2/A^2)].$$

In this case, because the number of spots N had been an exponent in the calculation of $T_{non}$, this exponent N becomes a simple factor in the logarithm. This linear relationship between N and $D_{non}$ in the non-interacting case is a key reason why photographic images tend to appear more "realistic" than, for example, xerographic renderings of half-tone images.

Figure 5:
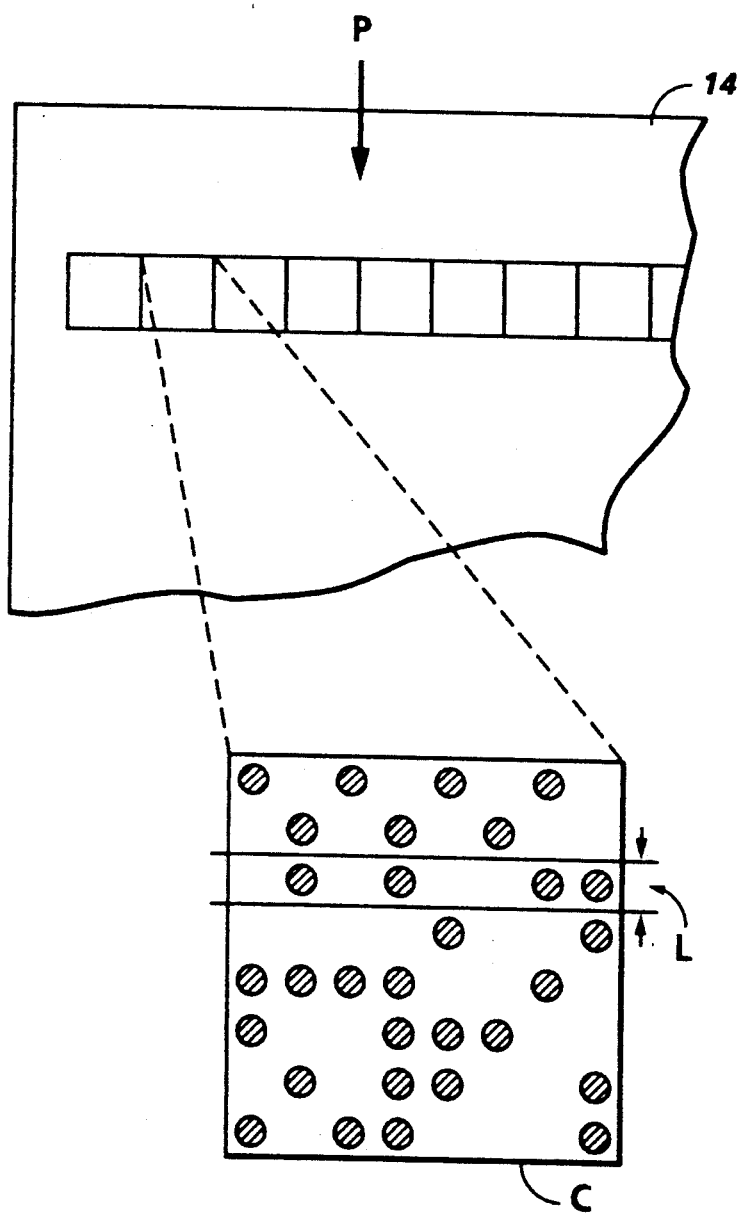
FIG. 5 illustrates the placement of cells on a sheet to form an desired half-tone image, according to the present invention.
Figure 6A:
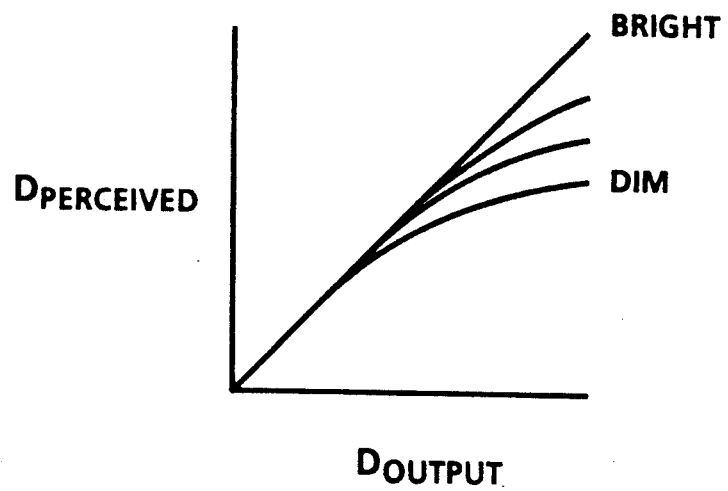
FIGS. 6A and 6B are graphs illustrating an optical principle relevant to the present invention.
Figure 6B:
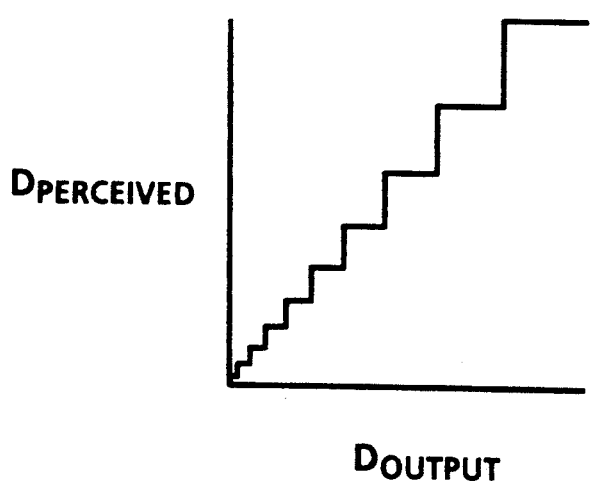

Another practical difficulty with the creation of contoured gray scaled images with an ink-jet printing apparatus is described graphically in FIGS. 6A–6B. When observing physical reality, the eye responds to light reflected from physical objects; however, when observing a half-tone picture intended to mimic the appearance of physical objects, the eye is actually observing ink which, by its placement, can only subtract from the inherent reflectivity of a sheet. Ideally, the placement of ink on a sheet creates a "darkness" to a printed image which is the converse of the "lightness" of the desired optical illusion manifest in the printed image. In reality, however, this converse relationship is difficult to achieve over a range of gray scales. FIG. 5B is a graph illustrating the relationship between the density of ink distributed on a sheet to form an image (in terms of D, the base-10 logarithm of transmission) and the apparent density as would be sensed by a human observer under various illumination conditions of the printed image. The graph shows that, when an area in a printed image is particularly dense (i.e., dark), the relationship between the amount of ink covering the sheet and the perceived density of the created image ceases to be linear, particularly when the density of the printed image is in excess of 1 (90% ink coverage on the sheet). This nonlinearity becomes particularly apparent when the light used to illuminate the image itself is particularly dim. Generally, it has been found that once the density exceeds 1, the relationship between printed density and perceived density goes from a linear relationship to a ⅓-power relationship. Visually, this nonlinearity is another way of explaining the characteristic "contrastiness" of xerographic photocopies of photographs.

When a typical office printing device, not only an ink-jet printer, but many types of xerographic or laser printers as well, outputs half-tone images from digital data, the variations in half-tones are almost invariably accomplished by selecting the most appropriate half-tone from a fixed selection of discrete gray scales. Even if, in creating a half-tone image, the printer may select from a range of 64 possible gray scales, the relationship between the desired image and the printed image is likely to become noticeable in that a continuous contour (as in a picture of a human face) is divided into separate areas, each having a fixed nearest gray scale. This discreteness of gray scales becomes problematic when the Weber-Fechner Law comes into effect. FIG. 6B shows a "digitized" equivalent of the relationship of FIG. 6A, wherein the smooth continuous function of FIG. 6A is converted into a step function by the selection of discrete gray scales in a printer. As can be seen, because the printer can output only fixed gray scales, the discontinuities of the relationship cause extremely significant deviations from the actual relationship, and these deviations become more pronounced as the density increases. Clearly, the combination of fixed gray scales and the Weber-Fechner Law will cause serious problems in rendering realistic images.

Based on the above discussion, it becomes apparent that an ink-jet printing process can be improved by the emulation of non-interacting spot placement within a half-tone image. In order to create this random placement of spots on a sheet, it would be preferable to randomize the placement of each spot in both x and y directions on the sheet to produce a truly random, i.e. non-interacting, distribution of spots as they are created. However, such two-dimensional randomization of spot placement is inconvenient in a high-speed full-width printing apparatus because the randomizing of spot placement would require a randomization of ejector activation across the linear array of nozzles within the area of each cell. To reduce the number of operating ink-jets so that one ink-jet is assigned to each cell would either create problems with resolution or would be unacceptably slow.

According to the present invention, the placement of spots is made non-interacting in one dimension on the sheet only. The spots are placed on the sheet along parallel, evenly spaced lines, but along each line spots are distributed according to a probability function which causes spots to be placed in a random way according to the optical density of a particular cell within a desired image. This arrangement of spots is shown in FIG. 1C. Such a semi-random arrangement of spots on a sheet is not only advantageous from a visual viewpoint, but is particularly suitable for commercial manifestations of ink-jet printing apparatus.

FIG. 2 is a simplified elevational view showing the basic arrangement of a full-width array ink-jet printhead as it applies a set of spots, in equally-spaced parallel lines, onto a sheet moving relative to the printhead in a process direction (indicated as P) perpendicular to the line of the linear array of ejectors. In FIG. 2 is shown a printhead 10, extending in one direction, and which includes a series of nozzles 12, facing downward in the view of FIG. 2, each nozzle being associated with one thermal ink-jet ejector. In a typical commercially-available embodiment of an ink-jet printhead, the nozzles 12 are provided with a resolution in the linear array of 300 nozzles per inch, although embodiments having a resolution of up to 600 nozzles per inch are currently proposed. The number of nozzles per inch in the linear array translates directly into an image resolution of spots per inch. In the illustration of FIG. 2, the size of the spots created by the nozzles 12 on sheet 14 are obviously exaggerated for purposes of illustration. The resolution of spot placement in the direction of motion of the sheet 14 is accomplished by a coordination of the operation of the individual nozzles in an imagewise fashion with the movement of sheet 14 relative to printhead 12.

When operating a full-width array printhead 12 in accordance with the present invention, the spacing of individual nozzles along the linear array of printhead 12 while sheet 14 moves relative thereto in a direction perpendicular to the linear array is conducive to one-dimensional randomization of the distribution of spots within each parallel line created by an ejector in the linear array. Thus, in the case of a full-width array of nozzles in a printhead 10, the present invention may be embodied in a system wherein the timing of ejection of spots from each nozzle in the printhead 10 be controlled relative to the motion of sheet 14.

Figure 3:
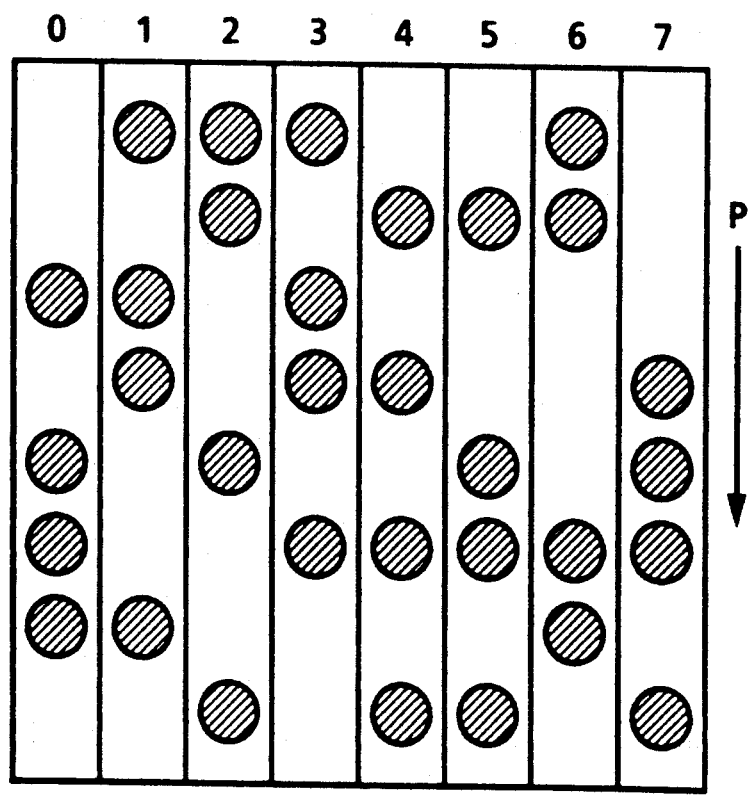
FIG. 3 is a detailed view showing the distribution of ink spots in an area according to the present invention.

In FIG. 3 is shown a sample cell of eight spot areas (areas in which a spot could be placed) by eight spot areas. Once again, the spots themselves are intended to have a resolution of 300 spots per inch or perhaps 600 spots per inch, giving an idea of the actual size of such a cell. In the cell of FIG. 3, equally spaced ink-jet nozzles are randomly modulated with pulses that place spots randomly in the process direction P of the cell only. If $N_{max}$ is defined as the total number of spots that can be placed in a cell of an area of $A \times A$ without overlap of spots and the number of spots in each vertical column is defined as either Y or Y+1, the number of columns in the cell with Y spots is $[(N_{max})^{\frac{1}{2}}-X]$, and the number of columns with Y+1 spots is given as X, Y may be larger than $(N_{max})^{\frac{1}{2}}$, but X may never be larger than the square root of $N_{max}$. Then the amount of transmission, the ratio of the area of the spot in the cell to the total area of the half-cell, is given by:

$$T = [1-(N_{max})^{-\frac{1}{2}}]^Y (1-[X/(N_{max})]).$$

where it is assumed that the number of spots within the vertical columns of the cell never differ by more than one spot. Therefore, based on the above equation, the optical density of the cell is given as:

$$D = Y \log_{10}[1-(N_{max})^{-\frac{1}{2}}]^{-1} - (X/N_{max})\log_e^{-1}(10)$$

As can be seen in the above equation, the dependence of the optical density D upon Y and X is a linear relation, meaning that the optical density still increases linearly (as in the desirable case wherein the placement of spots is completely non-interacting) with only a small error. Consequently, it is clear that a satisfactory approximation of the non-interacting case of spot placement is possible by randomizing the position of spots in one direction only. In the cell of FIG. 3, as shown, the arrangement of columns of spots in the process direction P is uniform and equidistant, as the spots in each column are created by uniformly adjacent ejectors, while the arrangement of spots in the horizontal rows, which corresponds to the action of the ejectors over time as the sheet moves relative to the ejectors, is random within each column. Thus, the arrangement of spots within the cell is uniform (interacting) in the process direction P and random (non-interacting) in the other dimension.

Because the number of spots to be placed within a given cell of a desired image is a function of the intended shading of the cell, and because random placement of spots within each line of the cell is required, it follows that, in order to carry out the theory of the present invention, spots must be placed or not placed in the available areas within each cell according to a probability function. That is, although a desired shading may require that a certain total number of spots be placed in a given cell, the necessary randomness of the actual placement of spots requires the decision to place or not place a spot in a given area within a cell to be a decision constrained by a predetermined probability. For example, if a given cell in a desired image to be printed requires 50% ink coverage, essentially every other available spot along the lines within the cell must be occupied by a spot, with the remaining areas left blank. However, merely to alternate the printing and non-printing of spots within a cell, as in a checkerboard fashion, may not provide the necessary "non-interacting" properties necessary for a realistic rendering, particularly in the case of cells having more or less than 50% ink coverage. Therefore, in order to attain the desired ink coverage while retaining the non-interacting properties of spot placement, a source of randomness must be introduced. Even at 50% coverage, it is not likely that a mere alternation of spots and non-printed areas will result if a probability function is used, inasmuch as it is not likely that repeated tosses of a coin will automatically result in perfectly alternating heads and tails.

In order to obtain both the necessary desired number of spots within each cell according to the desired shading of the area, and to ensure the randomness of spot distributions within each cell, it is preferred that a random number generator be employed, with the output of which being processed according to the desired shading of the cell being printed. For example, if it assumed for sake of illustration that a given random number generator outputs numbers from 0 to 99, and a desired shading of a given cell in an image is 30%, and it is assumed that a given cell is of an area of 64 spot areas, the printing of each spot area (whether to place a spot in the available area or not) should be made dependent on the output of the random number generator for each spot area. In the case of 30% shading, a spot should be placed in a particular spot area within the cell only if, for example, the given output of the random number generator is less than 30. If the cell is desired to have 70% coverage, than it follows that a spot should be printed only when the random number is less than 70. Variations of this general technique will be apparent to one skilled in the art. The purpose of such a probability function applied to each decision on whether to print a spot in a given spot area within a cell is to ensure the result at least very close to the desired total number of spots to be printed within the cell, while preserving the necessary randomness of spot placement which creates the desired non-interacting optical effect.

Figure 4:
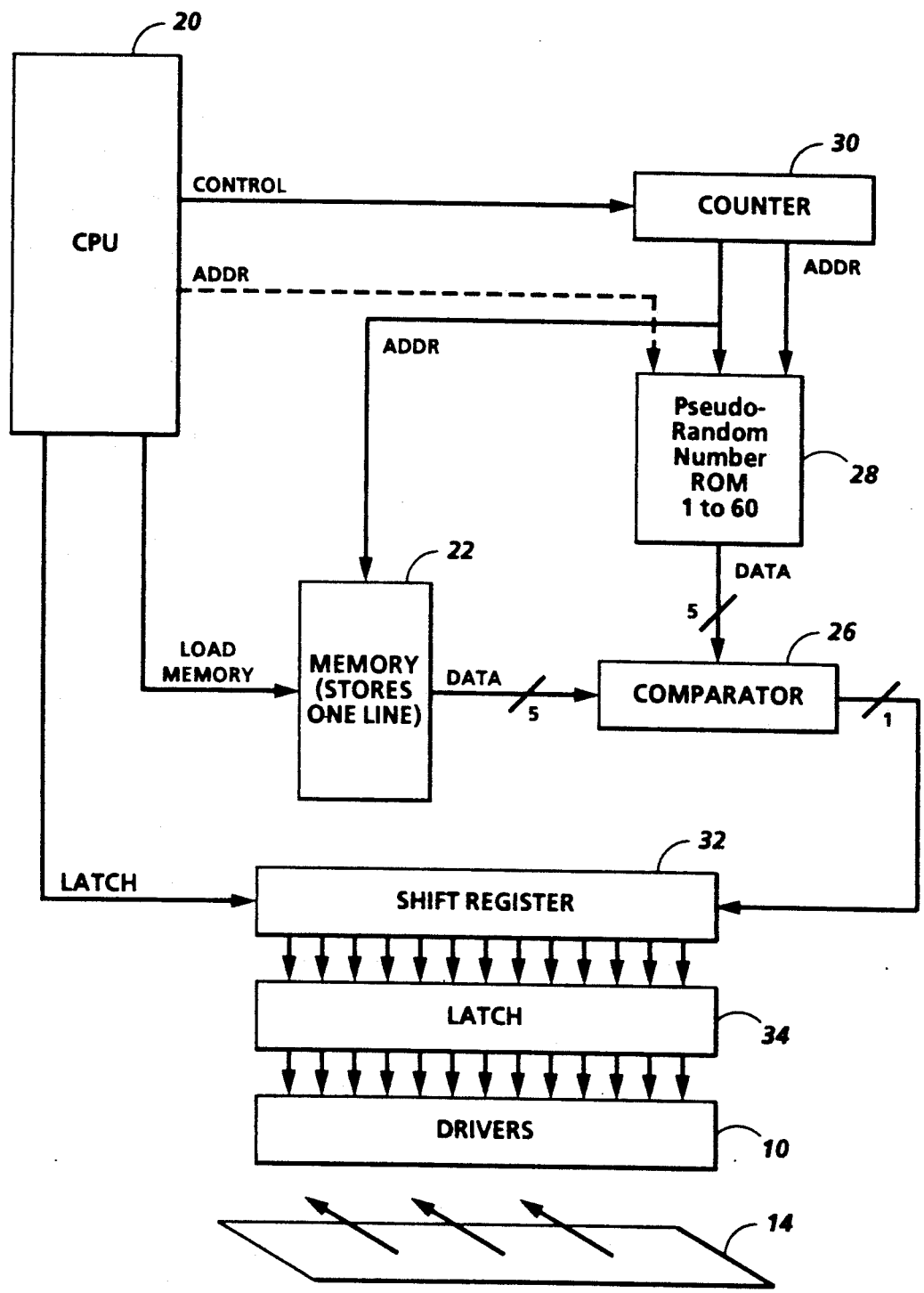
FIG. 4 is a systems diagram illustrating one embodiment of the present invention.

FIG. 4 is a simplified system diagram showing how the above-described probability function can be applied to a thermal ink-jet printing apparatus, in this case a full-width array thermal ink-jet printing apparatus. (It is also possible to embody the present invention in a thermal ink-jet printer wherein a relatively small printhead scans across a sheet in repeated swath, and adaptation of the present invention to such a system will be apparent to one skilled in the art.) FIG. 5 is an illustration of a set of cells, marked C, printed on a sheet 14 by the system of FIG. 4. Returning to FIG. 4A, the original digitized image data for an image to be printed is maintained in a memory, which is controlled by a CPU 20. This memory and CPU 20 can be part of any type of digital image-processing system, such as a networked printer, or a digital copier. In the memory, the individual pixel data for the desired image to be printed is kept as a set of addressed numbers. Although individual pixels in a desired image may be in one-to-one correspondence with ink-jet emitters in the printer, for the present invention it is preferred that each individual pixel having data associated therewith correspond to a cell in the image (e.g., an area of eight by eight spot areas to be printed by ink-jet nozzles) at least in the portions of the desired image intended to have half-tones. From this original store of data in the memory, image data is unloaded into buffer 22 one line at a time. Referring to FIG. 5, one "line" L of image data refers to a line processed by all of the ink-jet ejectors at a time, that is, in a line perpendicular to the process direction P of the sheet as shown in FIG. 2. Within each such line of downloaded image data, (assuming, for the moment, that all of the data to be printed on the sheet is in the form of a half-tone image) all of the adjacent pixel data will be grouped into adjacent individual cells in a given line L. In the example in which each cell C is an array of 8×8 spot areas, each quantity of information for each ejector will be grouped into adjacent groups of eight for purposes of creation of cells. A full-width array ink-jet printer thus prints a portion of cells C through a line L with each activation of the ejectors in printhead 10.

The random number generator 28 is preferably in the form of a ROM (read only memory) loaded with a plurality of tables of random numbers. In the present example, it will be presumed that the range of gray scales to be printed number 64 levels. In such a case, each table in the ROM of random number generator 28 is loaded with random numbers from 0-63. Controlling the memory 22 and random number generator 28 is a counter 30. In the preferred embodiment, the counter 30 outputs a sequence of digital words having a plurality of bits. The least significant section of the words from counter 30, the low bits, is directed to the random number generator 28. The upper or more significant output of the counter 30 is directed to both the random number generator 28 and the buffer 22.

For printing one line in a full-width array, each group of adjacent ejectors in the linear array being associated with one cell C in the desired image, the sequence of events are as follows. CPU 20 loads the buffer 22 with one line of gray scale encoded data. This data consists of one word for each cell, with the number of words of data equaling the number of gray cells per line. In the case of a 64 level gray scale capability, each gray cell will have associated with it one 5-bit word. At the beginning of the printing cycle, the counter 30 is set to 0. The CPU 20 then commands the counter 30 to cause the first word of gray scale data to be directed to a digital comparator 26, and also begins the downloading of corresponding random numbers from 0 to 63 to be directed to digital comparator 26 simultaneously. If the random number from random number generator 28 is greater than the value of the 5-bit word of data, the output of the comparator is one, if the random number is equal to or less than the data, the comparator output is 0. Thus, using this convention in which a higher gray scale word corresponds to a darker gray scale, the higher the gray scale word, the more likely it will be greater than a given random number from random number generator 28, and therefore the more "ones" will be output from comparator 26.

Whether the output from comparator 26 is a 1 or a 0, the bit is then loaded into shift register 32, and then the counter 30 is advanced. In the next cycle, the same gray scale word is sent to the comparator 26 along with a new random number from random number generator 28, and the process is repeated a number of times until the width of one cell is loaded into the shift register. When the number of bits sent to the shift register 32 equals the width of a cell, the address to the buffer 22 is advanced so that data for the next cell or pixel will be sent through the comparator process. This comparison process is repeated until one line of ones and zeros is placed in the shift register, consisting of one line of spot areas in a line L of cells C to be printed. After this entire line is loaded into shift register 32, the latch 34 is post by CPU 20 and the line data of ones and zeros is down loaded from shift register 32 into latch 34. Once the data for one line is loaded out of the shift register 32, counter 30 is reset to 0 for loading of data for the next line. The data in latch 34 is then used to activate the linear array of ink-jet ejectors 10 to print out the line of the image, while the sheet is advanced one spot width.

In one typical example, each half-tone cell comprises 8×8 spot areas. Thus, each cell width corresponds to eight adjacent ones and zeros within a line, and therefore a row of half-tone cells is printed out with every eight lines L of spots, as in FIG. 3. Thus, after eight lines are printed to form one row of half-tone cells, (or, more generally, when the number of lines equal to the width of a half-tone cell is completed), a new line of gray scale data is loaded from CPU 20 into buffer 22, and the above steps repeat with the CPU selecting a new table of random numbers from random number generator 28.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A method of printing a desired image on a sheet, the desired image having an area of a predetermined gray scale, comprising the steps of:

converting the predetermined gray scale of the area of the desired image to a probability function, by comparing a value related to the predetermined gray scale of the area of the desired image to one of a series of random numbers wherein the predetermined function is a result of the comparison;

emitting droplets of liquid ink from a printhead to print corresponding spots on the sheet; and aligning the spots on the sheet in a series of equally-spaced parallel lines, whereby the droplets are emitted to print corresponding spots on the sheet in random positions along each of the lines with a frequency related to the probability function, so that the spots within each of the lines are non-interacting along a direction of the equally-spaced parallel lines.

2. A method as in claim 1, further comprising the step of proportioning a selected portion of each of the lines occupied by a spot relative to the length of the selected portion of the line as a function of the predetermined gray scale of the area of the desired image.

3. A method as in claim 1, further comprising the steps of:

providing in the printhead a linear array of ink-jet ejectors for emitting droplets of liquid ink, the linear array extending in a first direction;

moving the sheet relative to the printhead in a process direction perpendicular to the first direction; and operating the ejectors such that each of the ejectors in the linear array corresponds to one line of the series of parallel lines in the desired image.

4. A method as in claim 1, further comprising the steps of:

converting the predetermined gray scale of an area of the desired image to a value related to the desired ink coverage in the area;

generating a random number;

comparing the value related to the desired ink coverage in the area to the random number;

emitting a droplet of liquid ink onto the sheet when the random number is of a predetermined relationship to the value related to the proportion of ink coverage in the area.

5. A method as in claim 4, wherein the generating step generates a random number from a range of random numbers corresponding to a resolution of gray scale values, and wherein the droplet of ink is emitted when the random number is greater than the value related to the proportion of ink coverage in the area.

6. An apparatus for printing a desired image on a sheet, the desired image having an area of a predetermined gray scale, comprising:

a printhead for emitting droplets of liquid ink to print spots on the sheet, so that the spots are aligned in a series of equally-spaced parallel lines; and control means for controlling the printhead to print spots in random spatial distribution within each of the series of parallel lines, whereby a proportion of a preselected length of each of the lines that is occupied by a spot is dependent on the predetermined gray scale of the area of the desired image.

7. An apparatus as in claim 6, wherein the control means further includes:

means for converting the predetermined gray scale of an area of the desired image to a probability function, and means for causing the printhead to print spots on the sheet in random spatial distribution within each of the lines with a frequency related to the probability function.

8. An apparatus as in claim 6, wherein the control means further includes:

means for converting the gray scale of an area of the desired image to a value related to the proportion of ink coverage in the area, means for generating a random number, means for comparing the value related to the proportion of ink coverage in the area to the random number, and means for causing the printhead to emit a droplet of liquid ink onto the sheet when the random number is of a predetermined relationship to the value related to the proportion of ink coverage in the area.

9. An apparatus as in claim 8, wherein the generating means generates a random number from a range of random numbers corresponding to a resolution of gray scale values, and wherein the droplet of ink is emitted when the random number is greater than the value related to the proportion of ink coverage in the area.

* * * * *